Figure 1:
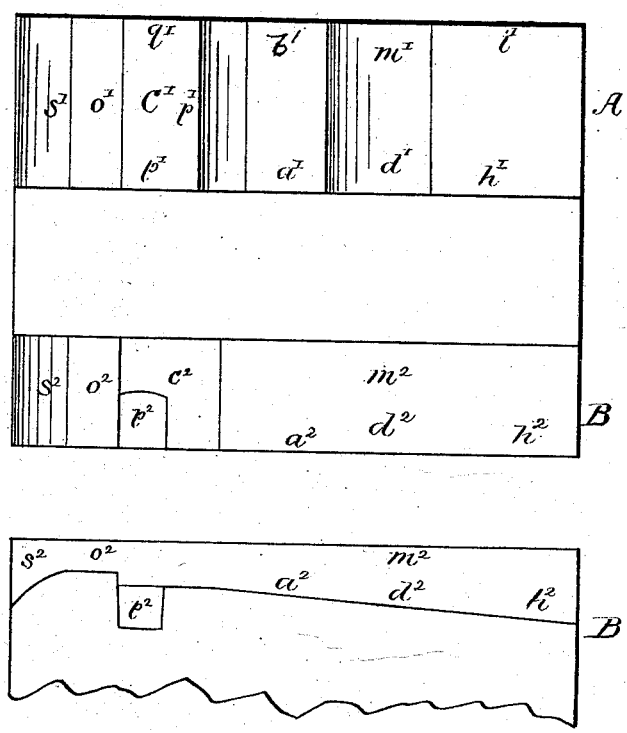

(Model.)

7 Sheets—Sheet 1.

H. B. HICKS.
DIE FOR FORGING BICYCLE HEAD BLANKS.

No. 252,461.  Patented Jan. 17, 1882.

WITNESSES
E. A. Phalen.
A. H. Raymond

INVENTOR
Horace B. Hicks,
By Charles E. Pratt,
Atty (Model.)

7 Sheets—Sheet 2.

H. B. HICKS.
DIE FOR FORGING BICYCLE HEAD BLANKS.

No. 252,461.

Patented Jan. 17, 1882.

WITNESSES

INVENTOR
Horace B. Hicks,
By Charles E. Pratt,
Att'y (Model.)

H. B. HICKS.
DIE FOR FORGING BICYCLE HEAD BLANKS.

No. 252,461. Patented Jan. 17, 1882.

7 Sheets—Sheet 3.

WITNESSES
E. A. Phalen
H. H. Raymond

INVENTOR
Horace B. Hicks,
By Charles E. Pratt,
Atty (Model.)

7 Sheets—Sheet 4.

H. B. HICKS.
DIE FOR FORGING BICYCLE HEAD BLANKS.

No. 252,461. Patented Jan. 17, 1882.

Fig. 8ˣ.

WITNESSES
E. A. Whalen
A. A. Raymond

INVENTOR
Horace B. Hicks,
By Charles E. Pratt,
Atty.

N. PETERS, Photo-Lithographer, Washington, D. C.

(Model.)

7 Sheets—Sheet 5.

H. B. HICKS.
DIE FOR FORGING BICYCLE HEAD BLANKS.

No. 252,461.

Patented Jan. 17, 1882.

WITNESSES

INVENTOR
Horace B. Hicks,
By Charles E. Pratt,
Atty (Model.)

7 Sheets—Sheet 6.

H. B. HICKS.
DIE FOR FORGING BICYCLE HEAD BLANKS.

No. 252,461.  Patented Jan. 17, 1882.

WITNESSES
E. A. Chafee
F. F. Raymond 2d

INVENTOR
Horace B. Hicks,
By Charles E. Pratt,
Atty

N. PETERS, Photo-Lithographer, Washington, D. C.

(Model.)

H. B. HICKS.
DIE FOR FORGING BICYCLE HEAD BLANKS.

No. 252,461. Patented Jan. 17, 1882.

WITNESSES
E. A. Chalus
G. G. Raymond

INVENTOR
Horace B. Hicks,
By Charles E. Pratt,
Atty

UNITED STATES PATENT OFFICE.

HORACE B. HICKS, OF HARTFORD, CONNECTICUT, ASSIGNOR TO THE POPE MANUFACTURING COMPANY, OF BOSTON, MASSACHUSETTS.

DIE FOR FORGING BICYCLE-HEAD BLANKS.

SPECIFICATION forming part of Letters Patent No. 252,461, dated January 17, 1882.

Application filed March 11, 1881. (Model.)

*To all whom it may concern:*

Be it known that I, HORACE B. HICKS, of the city of Hartford and State of Connecticut, have invented certain new and useful Improvements in Dies for Forging Bicycle-Head Blanks, of which the following is a specification.

My present improvements relate to that part of the bicycle known as the "head" or "upper part," containing the centers, in which the spindle of the perch or backbone turns, and from which project downward the front forks on either side the large driving and guiding wheel, to carry bearings for the axle of the latter, and particularly to that class of bicycle-heads known as the "Ariel" or "open" head; and the nature of my improvements will appear from the following description, taken in connection with the accompanying drawings.

In the construction of a bicycle it is necessary that a head should be constructed to bear great strain in every direction—that is, with great strength and rigidity—and at the same time with as much lightness as is consistent with the strength and rigidity required, and which can only be attained by the utmost economy of metal. It is also another prime requisite that there shall be as few joints as possible, every opportunity secured of dispensing with a screw or bolt or joint or welding being an advantage. To secure such advantages as these and others which will be apparent, as well as to obviate the difficulties which have existed heretofore in the construction of bicycle-heads by hand-forging, principally, and by forging in several parts and then welding or otherwise fastening them together, are the objects of my present improvements.

Figure 27:
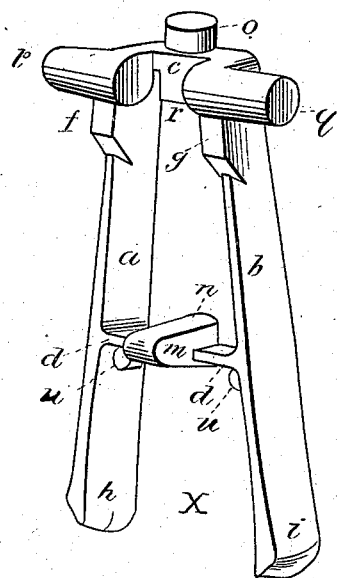

In the drawings, X in Figure 27 represents in elevation my improved open-bicycle-head blank, and the remaining figures are intended to represent contrivances embodying my improvements in machinery for producing such a head-blank and the head-blank itself in different stages of construction.

Figure 2:
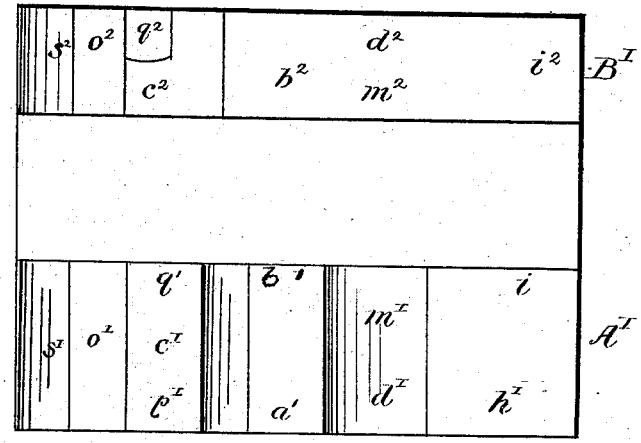
Figure 3:
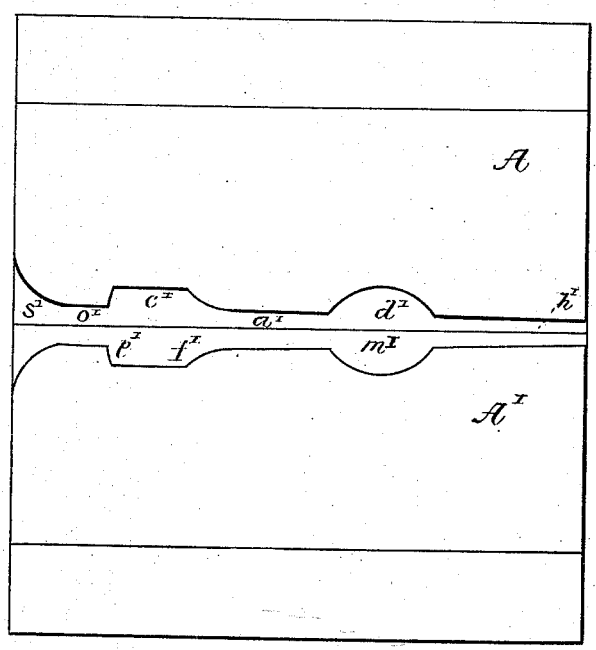
Figure 4:
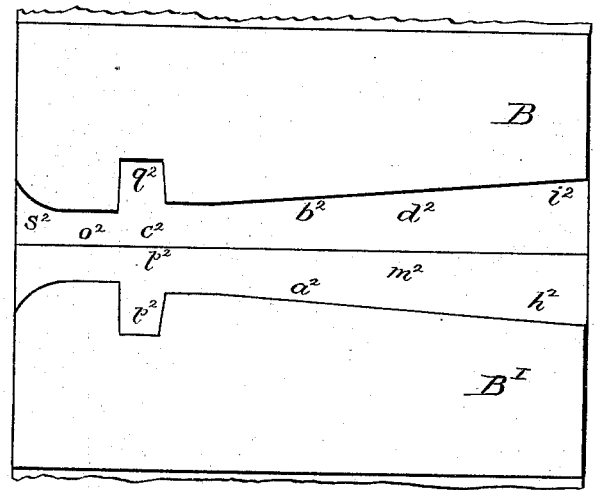
Figure 5:
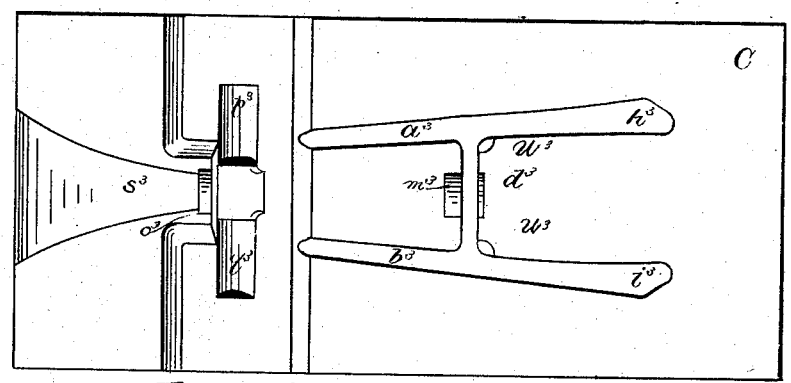
Figure 6:
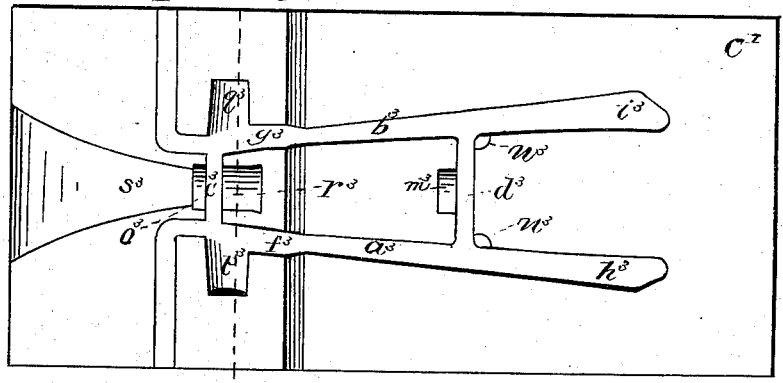
Figure 7:
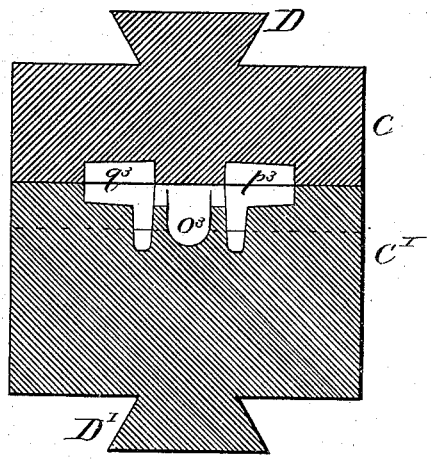
Figure 8:
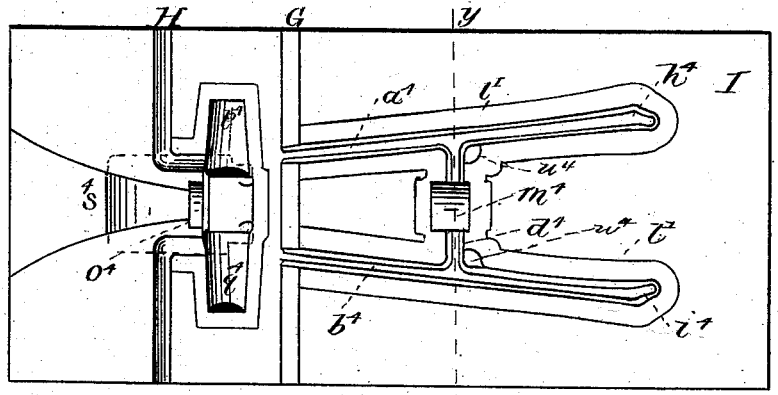
Figure 9:
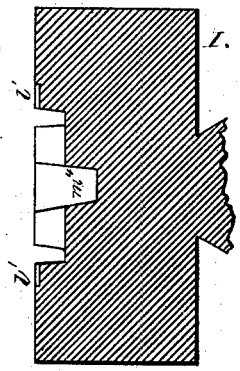
Figure 9:
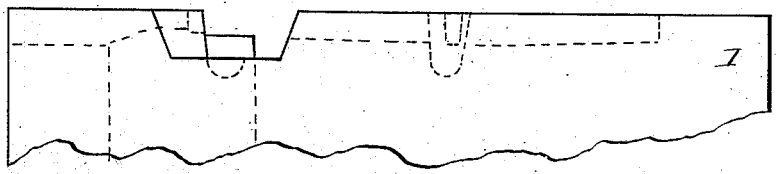
Figure 10:
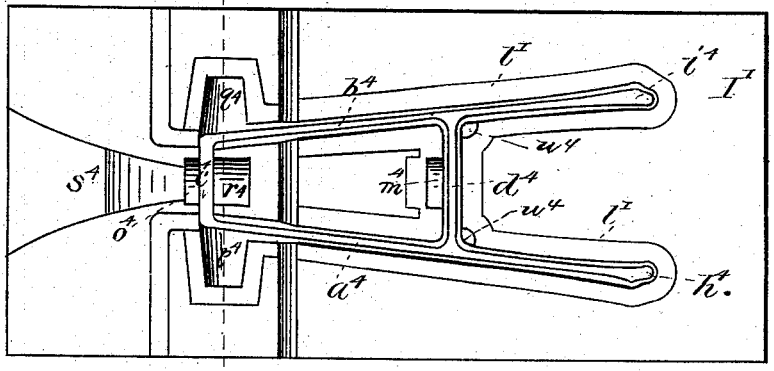
Figure 11:
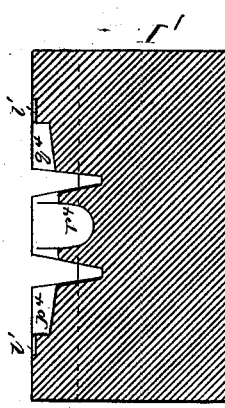
Figure 12:
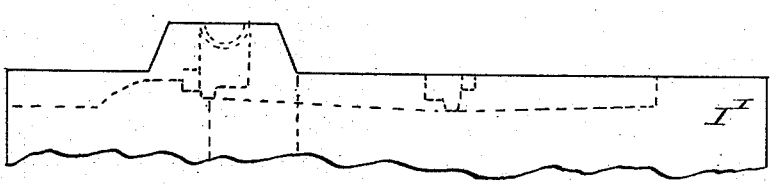
Figure 13:
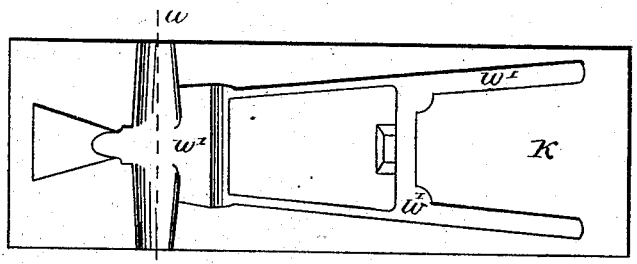
Figure 14:
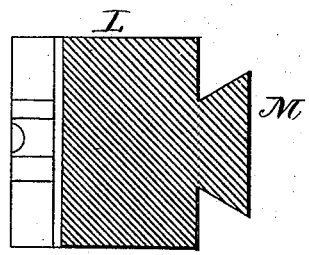
Figure 15:
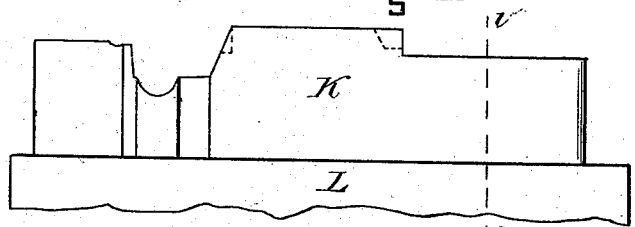
Figure 16:
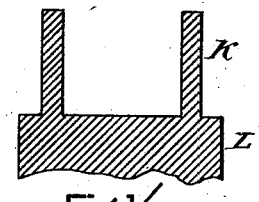
Figure 17:
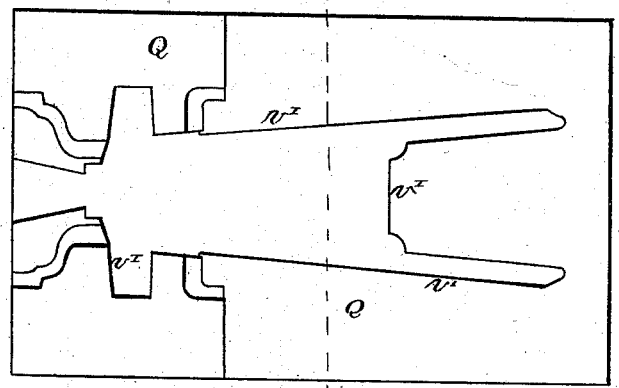
Figure 18:
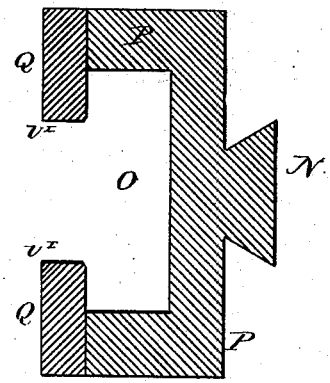
Figure 19:
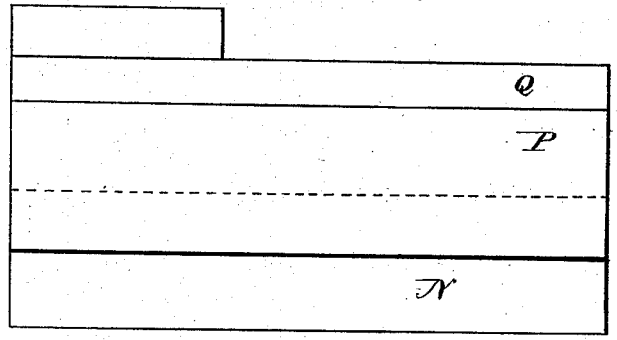
Figure 20:
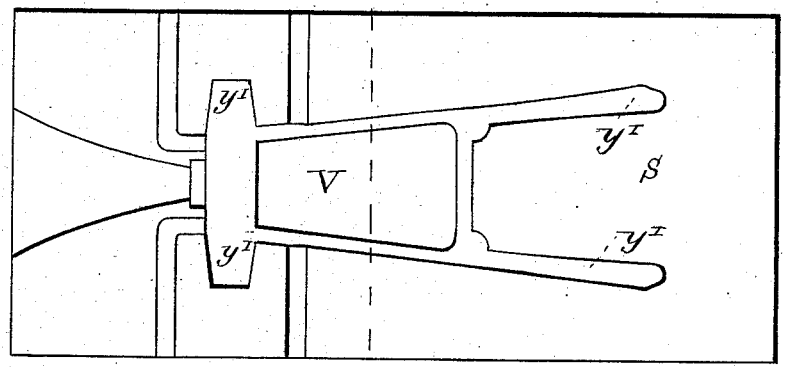
Figure 21:
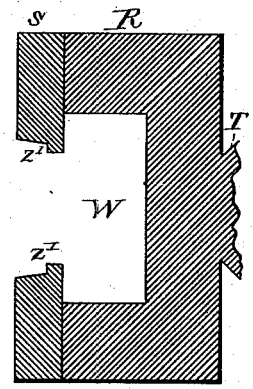
Figure 22:
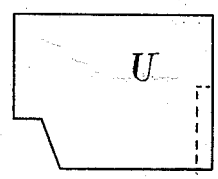
Figure 23:
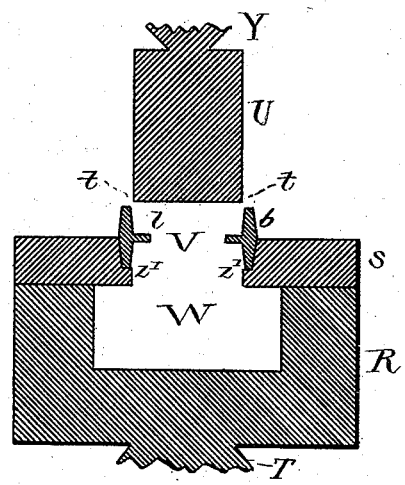
Figure 24:
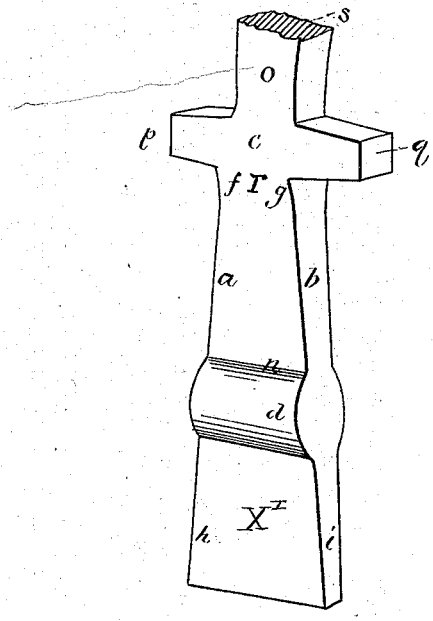
Figure 25:
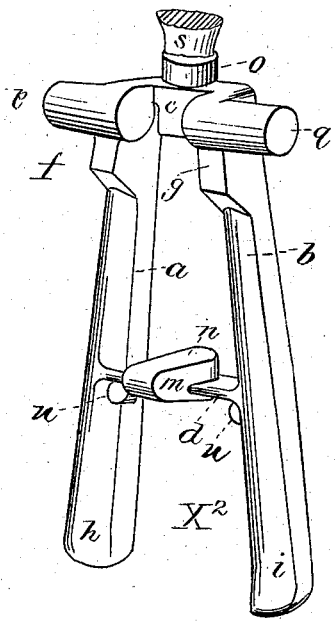
Figure 26:
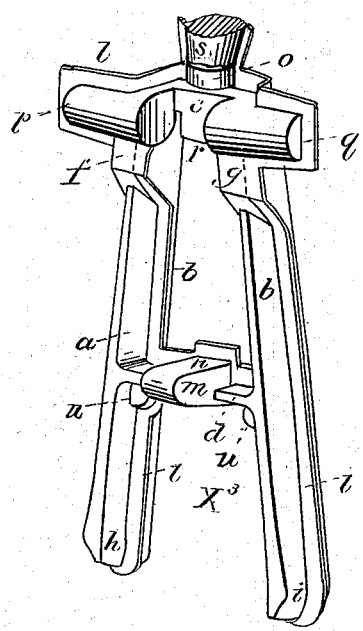

Fig. 1 shows first in bottom plan a block bearing the distributing-dies A and B, and then in side elevation that part of the block bearing the die B. Fig. 2 shows in top plan a block bearing the dies A' and B', corresponding with the dies A and B, and then in side elevation the die A'. Fig. 3 shows in elevation the dies A and A' brought together as in use. Fig. 4 shows in elevation the opposite side of the blocks from the previous position of the dies B and B', in position as in use. Figs. 5 and 6 show respectively the upper and lower break-down dies, C and C', in plan; and Fig. 7 shows in cross-section the blocks bearing the dies C C' as they are together in position for operation upon the line $x\,x$ in Fig. 6. Fig. 8 shows in plan the working-surface of a steel die, I, and Fig. $8^\times$ shows the same thing in cross-section on the line $y\,y$. Fig. 9 shows the same die in side elevation, some of the recesses being represented by dotted lines. Fig. 10 represents in plan an anvil-die, I', corresponding with the die shown in Fig. 8; and Fig. 11 shows the same in section on the line $z\,z$; and Fig. 12 shows the same in side elevation, some of the recesses being represented by dotted lines. Fig. 13 shows in plan an outside punch or upper die of a set, of which the corresponding end die or trimmer is shown in Fig. 17. Fig. 14 shows in cross-section on the line $u\,u$ a punch represented in Fig. 13. Fig. 15 represents in part elevation the same punch, and Fig. 16 represents the same in cross-section on the line $v\,v$ in Fig. 15. Fig. 18 shows in cross-section on the dotted line of Fig. 17 the trimmer, and Fig. 19 shows the same thing in elevation. Fig. 20 shows the inside trimmer or lower die of a set, of which Fig. 22 shows the punch. Fig. 21 represents in cross-section on the dotted line in Fig. 20 the same trimmer; and Fig. 23 shows in cross-section the punch and trimmer represented in Figs. 22 and 20 in position for operation, with the article to be operated upon resting upon the trimmer. Fig. 24 shows the crude form of my improved head-blank in process of construction as it leaves the distributing-dies A A' B B'. Fig. 25 shows the same in elevation as it leaves the break-down dies C C'. Fig. 26 shows the same thing in elevation as it leaves the forming-dies I I', and with the flash on, while Fig. 27 represents in elevation the same thing in its perfected form after it has passed the finishing-dies and trimmers and is completed so far as it is the object of my present improvements to complete it. On Figs. 1, 2, 3, and 4 small reference-letters are placed in such manner as to show upon what parts of the dies rest the portions of the bar or blank at different stages which correspond to the detail parts of X in Fig. 27.

X in Fig. 27 is my improved open-bicycle-head blank. $a$ and $b$ are standards. $c$ is the upper bridge. $d$ is the lower bridge.

$h\ i$ are the abrupt lower ends of the standards, to which are to be welded or otherwise attached the front forks of the bicycle.

$p$ and $q$ are lugs for the handle-rod or handle-bars.

$f\ g$ are braces or small superfluities of metal left of necessity during the operation of the dies and to be removed, as I generally dispose of them in order to reduce the weight, or they may be left as braces for the lugs $p$ and $q$.

$o$ and $r$ are lugs something in the form of opposite ends of a cylinder, as I prefer to make them, through which a threaded bolt is to be passed carrying the upper-center bearing.

$n$ is a thickened step for the lower-center bearing, and $m$ is a lug for carrying the elbow of the brake-lever.

The "centers" referred to in this connection are what are known as "steering-centers" or operating ends of the spindle attached to the perch of the bicycle, on which the front wheel and forks are made to turn laterally.

I make the lugs $p\ q$ with a recess or cavity between them to save weight of metal, and I carry them forward or cause them to project for their own thickness or more in front of the standards A and B, so that the handles may be carried farther forward from the rider—a construction practically desirable; and when they are constructed in this way the handle-rod may be a continuous one through both, or may be in two parts, each taking its bearing in one of the lugs.

I make the lugs $o\ r$ on the upper bridge, $c$, and the step $n$ on the lower bridge, the former to give a longer bearing for the adjusting-bolt, and the latter to afford opportunity for a concave cone-bearing for the lower center, which may be tempered without making the lower bridge brittle, and which, by reason of its thicker construction, is stronger and will admit of longer wear.

I make the lug $m$ projecting in front of the lower bridge, $d$, in solid forging with said bridge, that it may carry the elbow of the lever-brake operating upon the front wheel in a stronger and safer manner; and I thus obviate the necessity, also, of screwing or otherwise attaching a separate lug for this purpose on the opposite or rear side of this lower bridge, $d$; and just below it are the two small similarly-shaped lugs $u\ u$, intended to carry the trouser-guard projecting backward from the fork along and across the front wheel, below the perch; and by forging these lugs thus at the same time with the other parts I provide, without comparatively any expense, a stronger and better place of attachment for the trouser-guard than is obtained in any other way, whether by brazing, which is insecure, or boring front fork or lower bridge, which process is a weakening one.

A A$'$ are a corresponding pair of distributing-dies, attached to a metallic block suitably constructed for being placed in a drop-forge, A$'$ being the lower or anvil part, and A being the upper or hammer part, having in their surfaces the recesses or intaglios $s'\ o'\ c'\ a'\ m'\ h'$, &c.; and B B$'$ are another pair of corresponding distributing-dies, bearing on their faces the recesses $s^2\ o^2\ p^2\ a^2\ d^2\ h^2$, &c. These two pairs of dies may well be placed for convenience upon the same pair of blocks, and the recesses referred to are constructed of such form, substantially as indicated in the drawings, as to distribute the metal of an iron or steel bar operated by them into the form substantially shown in X$'$ in Fig. 24, the cavities $s'$ and $s^2$ being adapted to contain metal for the sprue $s$, the cavities $o'$ and $o^2$ adapted to contain sufficient metal for the lug $o$, the cavities $p'\ q'$ adapted to contain metal for the lugs $p$ and $q$, and so on with the other cavities and parts, of course in a rudely approximate way.

C C$'$ are respectively the upper and lower of a pair of break-down dies of cast-iron or other metal, in which are the cavities $s^3\ p^3\ q^3\ b^3\ a^3\ d^3\ m^3\ u^3\ m^3\ h^3\ i^3$, corresponding in proportion and curvature to the parts $s\ p\ q$, &c., the die C having a depression across its face between the two scarfs F and E, and the die C$'$ having a corresponding raised part of its surface having the scarfs F$'$ E$'$ corresponding with the scarfs F and E, the object of this formation being obviously to enable a suitable division of dies, so that all the parts of the metal may be operated upon by and removed from the dies, the greatest lateral diameter of the head at every point being on the line of the flash $l\ l\ l$. (Shown around it in Fig. 26.)

D D$'$ are dovetailed tenons on the block C C$'$, by which they may be handled and attached to other blocks or parts of the drop-forge mechanism.

I I$'$ are corresponding upper and lower dies of a pair, made of steel, having the recesses or intaglio parts $s^4\ o^4\ p^4\ q^4\ b^4\ a^4\ d^4\ h^4\ i^4\ m^4\ u^4\ w^4$, &c., and also with the slight recesses surrounding all the others, (indicated by $l'\ l'\ l'$,) for the flash or slight excess of metal struck off in the process of forging. The die I has also a depression across its surface between the scarfs H and G, and the die I$'$ has a raised portion of its surface between the scarfs H$'$ and G$'$.

L is a metallic block, having the dovetailed tenon M for handling or attaching to other parts of the forge apparatus, and bearing a punch, K, having the surfaces $w'\ w'\ w'$, substantially corresponding to the plan outline of one side of the head, (shown in Fig. 26,) and projecting in relief some considerable distance from the face of the block L.

P is a block, having a dovetailed tenon, N, for handling and attachment to other parts, and bearing on its upper face a trimmer, Q, of steel, having cutting-edges $v'$ $v'$ $v'$ around a recess or opening of form and proportions fitting the outline of the head X, (shown in Fig. 27;) and O is an opening or hollow in the block P, underneath the trimmer Q, into which the article operated upon may fall, and from which it may be withdrawn. This trimmer Q and punch K are designed for removing the flash $l'$ $l'$ $l'$ from the outer contour of the head $X^3$.

R is a metallic block, having the dovetailed tenon T for handling and attachment to other parts, and bearing on its face a trimmer, S, having an opening, $y'$ $y'$ $y'$ $y'$, with a lip, $z'$ $z'$, to fit the outer contour of one side of the head $X^3$, as shown in Fig. 26, and in which the head may rest securely when placed there, and having also the opening V between said lips or ledges $z'$ $z'$ and a cavity, W, beneath.

U is a punch, having a dovetailed tenon, Y, for handling, having a cutting-edge around its face, the contour of which fits the inner contour between the perches of the head $X^3$ in Fig. 26.

$s$ is the sprue, or that part of the metal which connects the article being operated upon with the bar from which it is forged.

In operating this machinery for the production of the head-blank X, as shown in Fig. 27, I proceed as follows: Distributing-dies A A' B B' being properly placed in a drop-forge, I take a bar of iron or steel of suitable dimensions, heat the end of it for several inches, as for ordinary forging, hold it first upon the distributing-die A', and cause it to be struck one or more blows with the die A. I then pass the bar over upon the die B', giving the bar a quarter-revolution, and cause it to be struck one or more blows with the die B, which operates upon it in a direction transversely to the direction in which the die A operates upon it. I pass it from one to the other of these dies more than once, if necessary, until it is given the form substantially shown at X' in Fig. 24, in which the metal is properly distributed in quantity sufficient for all parts to be forged in their respective positions. I then reheat the bar and place it upon the break-down die C' in position so that the parts $p$ $q$ (shown in Fig. 24) shall be over and upon the recesses $p^3$ $q^3$ in the die C', and the sprue $s$ to be in the recess $s^3$, and cause it to be struck one or more blows, or as many as may be required, with the die C. These dies C and C' have slightly-rounded edges bounding their recesses, and may be constructed of cast-iron, and are constructed to give only an approximate formation to the head-blank $X^2$, as shown in Fig. 25. I then reheat the metal of which the head-blank is being formed, and the forming-dies I I' being placed in proper position in a drop-forge, I place the blank upon the die I' so that the sprue $s$ shall be in the recess $s^4$ and the lugs $p$ $q$ shall be in the recesses $p^4$ and $q^4$, and cause it to be struck one or more blows with the die I, which forms it into the required shape substantially, and which operation strikes off a slight excess of metal in the form of a flash, $l$ $l$ $l$. I then, without reheating, place the head-blank upon the trimmer-die Q so that it shall rest securely therein, the trimmer Q and punch K being properly placed in a drop-forge, and, by a blow from the punch K, I drive the head-blank through into the cavity O, the cutting-edges $v'$ $v'$ removing the flash from the outer contour of the head. I then place the head-blank on the trimmer S so as to rest therein, as indicated in Fig. 23, the dies S and U being properly placed in a drop-forge, and by a blow from the punch U strike out the flash from the inner contour of the head-blank $X^3$ by means of the cutting-edges $t$ $t$ on the punch U. I then, with or without reheating, as may be required, place the head-blank again in the die I', and cause it to be struck one or more lighter blows with the die I, for perfecting or finishing the form, and in case any flash is produced by this step in the process, I remove it by use of the trimmers and punches in the same way as before, and produce the perfected head-blank X, ready for slight finishing and polishing by hand, and boring of parts for the reception of other pieces of the bicycle, as before referred to.

The braces $f$ $g$ may be removed, if desired, by any of the means well known in machine-shops.

I do not claim, broadly, the forging of an open-bicycle-head blank, nor the making of an open-bicycle-head blank in a drop-forge by the use of dies; but

I claim as new and of my invention—

1. The improved open-bicycle-head blank X, constructed with sides $a$ and $b$, bridges $c$ and $d$, arms $h$ and $i$, center-lugs $o$ $r$, braces $f$ and $g$, handle-bar lugs $p$ and $q$, brake-lug $m$, and trouser-guard lugs $u$ $u$, essentially as set forth.

2. The primary break-down dies A A', constructed and adapted to operate substantially as and for the purposes shown and described.

3. The secondary break-down dies B B', constructed and adapted to operate substantially as and for the purposes shown and described.

4. The primary forming-dies C C', having the described cameo and intaglio parts, and constructed and adapted to operate substantially as and for the purposes herein set forth.

5. The secondary forming-dies I I', having the described cameo and intaglio parts, and constructed and adapted to operate substantially as and for the purposes herein set forth.

6. Dies constructed in a corresponding pair and with recesses for approximately forming an open-bicycle-head blank, said recesses being substantially as herein set forth and designated by the reference-letters $a^3$ $b^3$ $c^3$ $d^3$ $h^3$ $i^3$ $p^3$ $q^3$ $m^3$ $o^3$ $r^3$, essentially as herein shown and described.

7. Dies constructed in a corresponding pair and with recesses adapted to form and substantially finish an open-bicycle-head blank, said recesses being substantially as herein set forth and designated by the reference-letters $a^4$ $b^4$ $c^4$ $d^4$ $h^4$ $i^4$ $p^4$ $q^4$ $u^4$ $o^4$ $r^4$ $m^4$, and the slight surrounding recesses $l'$ to receive the flash, essentially as herein shown and described.

8. Constructed and adapted to operate substantially as herein set forth, the trimmer Q, having an opening bounded by cutting-edges $v'$ $v'$ $v'$, corresponding to the outer contour of an open-bicycle-head blank, and the punch K, having the cameos $w'$ $w'$ $w'$, substantially conformed to the plan of an open-bicycle-head blank.

9. The trimmer S, constructed with the opening V, recesses $y'$ $y'$ $y'$, and lips $z'$ $z'$, and the punch U, with cutting-edges $t$ $t$, constructed and adapted to operate substantially as herein set forth.

HORACE B. HICKS.

Witnesses:
GEO. H. DAY,
E. J. POST.